(12) United States Patent
Bonaccorso

(10) Patent No.: US 11,576,530 B2
(45) Date of Patent: Feb. 14, 2023

(54) DETACHABLE COUPLING ARRANGEMENT FOR CONNECTING A HANDLE TO A UTENSIL

(71) Applicant: KONINKLIJKE PHILIPS N.V., Eindhoven (NL)

(72) Inventor: Davide Bonaccorso, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1336 days.

(21) Appl. No.: 15/736,498

(22) PCT Filed: Jun. 15, 2016

(86) PCT No.: PCT/EP2016/063671
§ 371 (c)(1),
(2) Date: Dec. 14, 2017

(87) PCT Pub. No.: WO2017/001191
PCT Pub. Date: Jan. 5, 2017

(65) Prior Publication Data
US 2018/0177343 A1    Jun. 28, 2018

(30) Foreign Application Priority Data

Jun. 29, 2015 (EP) .................................. 15174197

(51) Int. Cl.
*A47J 45/07* (2006.01)
*A47J 37/06* (2006.01)
(Continued)

(52) U.S. Cl.
CPC ......... *A47J 45/071* (2013.01); *A47J 37/0641* (2013.01); *B25G 3/18* (2013.01); *F16B 21/071* (2013.01)

(58) Field of Classification Search
CPC ... F16B 21/071; Y10T 16/4707; A47J 45/071; A47J 37/0641; B23G 3/18; Y10S 16/24; B25G 3/18
See application file for complete search history.

(56) References Cited

U.S. PATENT DOCUMENTS 945,659 A * 1/1910 Wilson .................. A47J 45/071
220/759
1,240,427 A * 9/1917 Dougherty ............ A47J 45/071
220/759
(Continued)

FOREIGN PATENT DOCUMENTS

EP            0329065 A2    8/1989
FR            936046 A  *   7/1948  ............ A47J 45/071
(Continued)

*Primary Examiner* — Matthew R McMahon
(74) *Attorney, Agent, or Firm* — Schott, P.C.

(57) ABSTRACT

A detachable coupling arrangement (1) for connecting a handle (2) to a utensil comprises a male portion (5), a female portion (4) adapted to receive the male portion (5), and a stop element (6) for preventing movement of the male portion (5) relative to the female portion (4) in an upward direction (A) A first retention element and a resiliently deformable second retention element (8) are configured to cooperate to prevent movement in a downward direction (B) when the female portion (4) is coupled to the male portion (5). The first retention element includes a retention surface and a lower surface (23). The second retention element (8) engages the lower surface (23), as the male portion (5) is received in the female portion (4) in the upward direction, and resiliently deforms so that the second retention element (8) locates over the first retention element and abuts against the retention surface.

15 Claims, 7 Drawing Sheets

(51) Int. Cl.
*B25G 3/18* (2006.01)
*F16B 21/07* (2006.01)

(56) References Cited

U.S. PATENT DOCUMENTS

| | | | | |
|---|---|---|---|---|
| 2,368,297 | A | * | 1/1945 | Hanke .................... A47J 45/071 |
| | | | | 220/759 |
| 3,334,782 | A | * | 8/1967 | Friberg ................. A47J 45/071 |
| | | | | 220/759 |
| 3,464,082 | A | | 9/1969 | Friberg |
| 3,815,175 | A | | 6/1974 | Szabados |
| 4,958,789 | A | * | 9/1990 | Shigeki ..................... F16B 2/16 |
| | | | | 248/56 |
| 5,373,608 | A | * | 12/1994 | Welch ................... A47J 45/071 |
| | | | | 16/425 |
| 5,558,570 | A | * | 9/1996 | Nakamura .............. B24B 23/00 |
| | | | | 16/426 |
| 5,575,516 | A | * | 11/1996 | Baumgarten ......... A47J 45/071 |
| | | | | 292/348 |
| 6,250,493 | B1 | | 6/2001 | Kwan |
| 7,975,874 | B2 | * | 7/2011 | Scott ..................... A47J 45/071 |
| | | | | 220/759 |
| 9,565,973 | B2 | * | 2/2017 | Paul ........................ A47J 45/10 |
| 2003/0229969 | A1 | | 12/2003 | Park |
| 2009/0038092 | A1 | * | 2/2009 | Kennedy ................. A47L 13/16 |
| | | | | 15/104.94 |
| 2010/0031475 | A1 | | 2/2010 | Scott |
| 2011/0005037 | A1 | | 1/2011 | Deuk |
| 2014/0366746 | A1 | | 12/2014 | Tsai |

FOREIGN PATENT DOCUMENTS

| | | |
|---|---|---|
| FR | 1332113 A | 12/1963 |
| GB | 612204 A | 11/1948 |
| GB | 879053 A | 10/1961 |
| GB | 2041212 A | 9/1980 |
| JP | 2011189017 | 9/2011 |

* cited by examiner

DETACHABLE COUPLING ARRANGEMENT FOR CONNECTING A HANDLE TO A UTENSIL

This application is the U.S. National Phase application under 35 U.S.C. § 371 of International Application No. PCT/EP2016/063671, filed on Jun. 15, 2016, which claims the benefit of International Application No. 15174197.2 filed on Jun. 29, 2015. These applications are hereby incorporated by reference herein.

FIELD OF THE INVENTION

The present invention relates to a detachable coupling arrangement for connecting a handle to a utensil. The present invention also relates to a handle and a utensil comprising cooperating portions of the detachable coupling arrangement and, in particular, an appliance for an air-based fryer product comprising the handle and utensil.

BACKGROUND OF THE INVENTION

Cooking accessories often comprise a handle to hold the accessories, and the user is unable to remove the handle. The advantage of this situation is that the accessory, a pan, for example, cannot fall off of the handle. However, cooking accessories with non-removable handles are often difficult to wash and store. Furthermore, the handles can get knocked during cooking and result in spillages or accidents.

It is known to use a removable handle for cooking utensils. Being able to remove the handle from a cooking utensil may help to reduce accidentally knocking the cooking utensils off of a stove or make them easier to store. However, known removable handles are often difficult to remove and reattach, especially with one hand.

Furthermore, it is known that removable handles are more prone to breaking due to the movement of parts for coupling and uncoupling the handle to the utensil. In addition, existing removable handles may be liable to accidental detachment in use, which is clearly undesirable.

It is known from US2010/0031475 to provide a bracket and handle for a cooking vessel. A spring biased locking pin protrudes from the handle and is controlled by a thumb slide to enable its releasable engagement with a bracket on the cooking vessel.

SUMMARY OF THE INVENTION

It is an object of the invention to provide a detachable coupling arrangement for connecting a handle to a utensil which substantially alleviates or overcomes one or more of the problems mentioned above.

The invention is defined by the independent claims. The dependent claims define advantageous embodiments.

According to the present invention, there is provided a detachable coupling arrangement for connecting a handle to a utensil, the detachable coupling arrangement comprising: a male portion; a female portion adapted to receive the male portion; a stop element for preventing movement of the male portion relative to the female portion in an upward direction when the female portion is coupled to the male portion; and a first retention element and a resiliently deformable second retention element configured to cooperate to prevent movement of the male portion relative to the female portion in a downward direction when the female portion is coupled to the male portion; the first retention element having a retention surface and a lower surface; and the second retention element being configured so that it engages the lower surface, as the male portion is received in the female portion, to resiliently deform the second retention element so that it locates over the first retention element and abuts against the retention surface.

Therefore, a user will be able to detach the handle from the utensil. This allows the user to use a single handle with multiple utensils. As a result the handles and utensils can be manufactured separately which is simpler and more efficient. Furthermore, it enables costs to be reduced and passed on to customers who may only need to replace one of the handle and the utensil. In addition, by removing the handle it is easier to wash and store the utensils as the footprint of the utensil is reduced and becomes more uniform without the handle.

Furthermore, the second retention element is able to flex to locate over the first retention element and then return to its original shape to abut against the retention surface. This means that the female portion and male portion can be coupled and uncoupled multiple times without reducing the effectiveness of the engagement or the structural integrity of the second retention element.

Advantageously, the detachable coupling arrangement may further comprise a guard element configured to limit the range of movement of the second retention element when disengaging the second retention element from the first retention element.

Therefore, the second retention element cannot be deformed too far by the user. The guard element prevents the second retention element deforming to the extent that it can no longer locate over the first retention element and abut against the retention surface when the male portion is coupled to the female portion. Furthermore, the guard element prevents the user from breaking the second retention element by over bending it.

Preferably, the second retention element may be configured to be biased away from the guard element to releasably fixedly locate the male portion relative to the female portion when the female portion and male portion are coupled together.

Therefore, the second retention element is securely located against the retention surface of the first retention element when the female portion and male portion are coupled together. This means that the male portion cannot be uncoupled from the female portion without intervention from the user.

Advantageously, the guard element may comprise an element that extends at an angle to the second retention element and is configured to limit the range of movement of the second retention element.

Therefore, the element can be configured to set the maximum release position attainable by the second retention element. Furthermore, the guard element can be reduced in vertical length so that it does not get in the way of the user when they are trying to reach around the second retention element to uncouple the male portion and the female portion.

Advantageously, the second retention element may comprise an abutment portion configured to abut said retention surface when the second retention element is in an engaged position and the male portion is coupled to the female portion.

Therefore, the abutment portion is able to cooperate with the retention surface of the first retention element to prevent movement of the male portion relative to the female portion.

Preferably, the abutment portion may be configured to abut the guard element when the second retention element is in a release position to enable the male portion to be uncoupled from the female portion.

Therefore, the second retention element is prevented from over bending and as a result is less likely to fail. Furthermore, the second retention element is able to be moved far enough that the second retention element does not contact the first retention element when uncoupling the male portion and the female portion.

Advantageously, the second retention element may further comprise a trigger portion configured to enable a user to resiliently deform the second retention element and urge the abutment portion from the engaged position to the released position to uncouple the male portion from the female portion.

Furthermore, the trigger portion can be designed so that the user can easily urge the abutment portion from its engagement with the retention surface to uncouple the male portion from the female portion when the user requires.

Preferably, the female portion may comprise a slot extending vertically along the length of the female portion.

Preferably, the male portion may be adapted to be slidably receivable in the female portion, the male portion comprising a projection, said projection being configured to be disposed in the slot.

Therefore, the male portion can be slidably coupled to the female portion. Furthermore, the handle and utensil can be coupled and lifted in one movement. In addition, the slot and projection help to reduce relative horizontal movement between the male and female portions.

Preferably, the first retention element may comprise a protrusion extending from a bottom part of one of the female portion and the male portion.

Therefore, the first retention element can be placed appropriately to cooperate with the second retention element without increasing the size of the bottom part which reduces the weight of the detachable coupling arrangement. Furthermore, the protrusion makes it more difficult for the male and female portion to be uncoupled from each other accidentally.

Advantageously, the first retention element may comprise a depression extending into a bottom part of one of the female portion and the male portion.

Therefore, the size of the retention surface can be increased without having to increase the thickness of the detachable coupling arrangement and consequently the distance between the handle and the utensil. The distance the second retention element is urged can be reduced which will help to prevent the second retention element breaking. Reduced size also makes storage easier.

Preferably, the stop element may extend across the top of the female portion.

With this arrangement, even if the first and second retention elements are broken, the utensil will not fall off the handle under the influence of gravity. Furthermore, the weight of the utensil will cause a moment towards the rest of the male portion rather than away so help keep the handle and utensil coupled. In an alternative embodiment, the stop element may be on the bottom of the male portion.

Preferably, the female portion may comprise the first retention element and the male portion may comprise the second retention element.

According to another aspect of the present invention, there is provided a handle comprising either one of the female portion and the male portion of the detachable coupling arrangement as mentioned above for attaching the handle to a utensil having the other one of the male portion and the female portion of the detachable coupling arrangement, respectively.

According to another aspect of the present invention, there is provided a utensil comprising either one of the male portion and female portion of the detachable coupling arrangement as mentioned above for attaching the utensil to a handle having the other one of the female portion and the male portion of the detachable coupling arrangement, respectively.

Therefore, a user may be able to use one handle with multiple utensils. Being able to remove the handle from the utensil also means that less storage space is needed for the utensil. In addition, the handle and utensil can be made separately and without the other component which reduces the cost of the unit.

Preferably, the utensil may be a cooking accessory for an air-based fryer product.

According to another aspect of the present invention, there is provided an appliance comprising a handle as mentioned above having either one of the female portion and the male portion of the detachable coupling arrangement; and the utensil as mentioned above having the other one of the male portion and the female portion of the detachable coupling arrangement.

Therefore, the appliance can be separated into the handle and the utensil for reducing the space taken up by the appliance or more specifically its footprint. Furthermore, the appliance can be separated from cleaning. For example, only the utensil may need to be cleaned or it may be easier to clean the handle and utensil separately.

Preferably, the appliance corresponds to an air-based fryer product.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
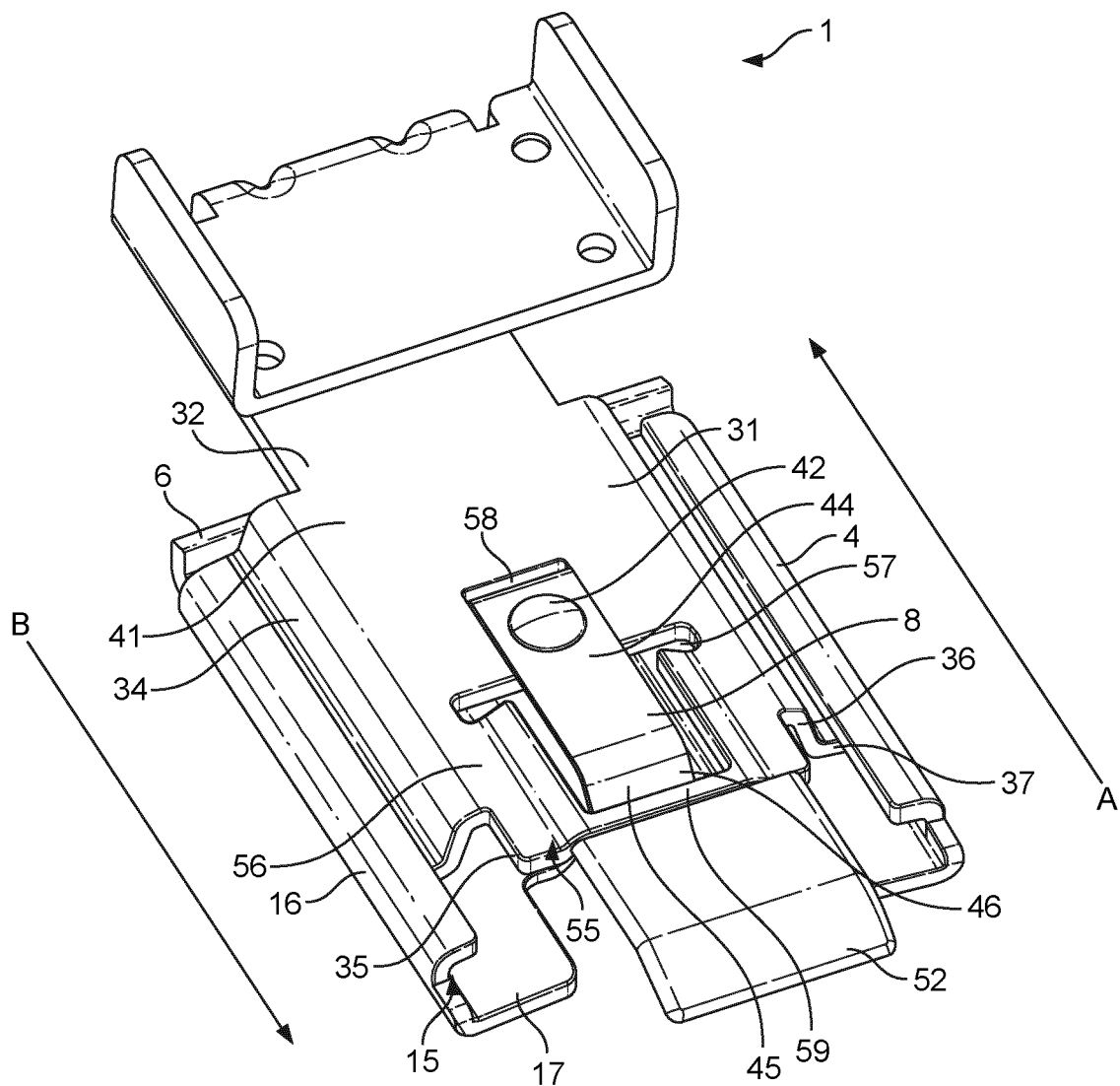
FIG. 1 shows a schematic perspective view of a detachable coupling arrangement of a first embodiment of the present invention, viewed from a male portion side when the detachable coupling arrangement is coupled.
Figure 2:
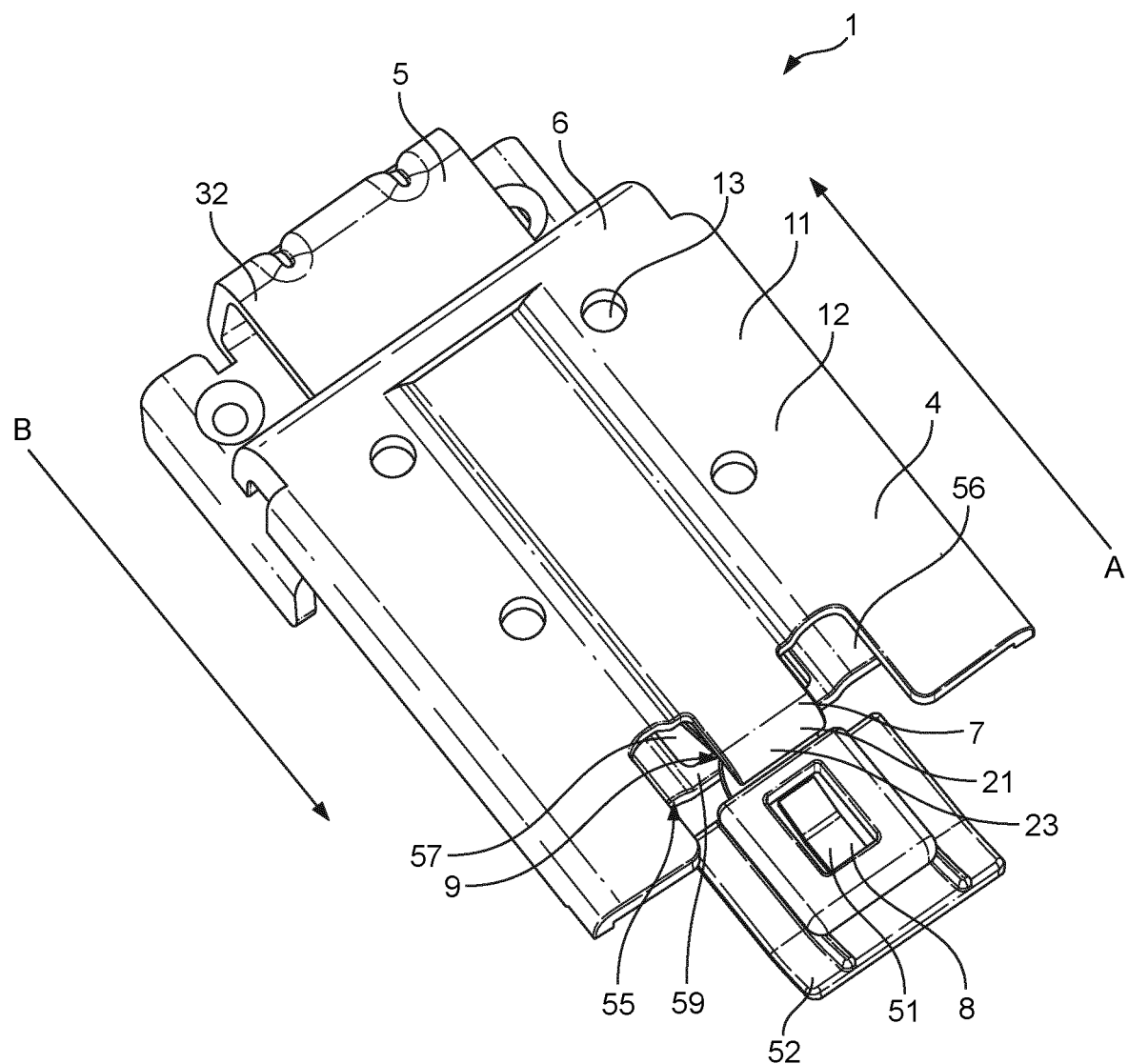
FIG. 2 shows a schematic perspective view of the detachable coupling arrangement shown in FIG. 1 from a female portion side when the detachable coupling arrangement is coupled.

FIG. 1 and FIG. 2 depict a first embodiment of the present invention. In this embodiment, there is provided a detachable coupling arrangement 1 for connecting a handle 2, shown in FIG. 4, to a utensil 3, shown in FIG. 3, comprising a female portion 4 and a male portion 5 adapted to cooperate with the female portion 4. The detachable coupling arrangement 1 further comprises a stop element 6 for preventing movement of the male portion 5 relative to the female portion 4 in an upward direction A when the female portion 4 is coupled to the male portion 5. The detachable coupling arrangement 1 further comprises a first retention element 7 and a resiliently deformable second retention element 8 configured to cooperate to prevent movement of the male portion 5 relative to the female portion 4 in a downward direction B when the female portion 4 is coupled to the male portion 5. The first retention element 7 has a retention surface 9 and the second retention element 8 is configured to locate over the first retention element 7 and abut against the retention surface 9 when the male portion 5 is coupled to the female portion 4.

Figure 3:
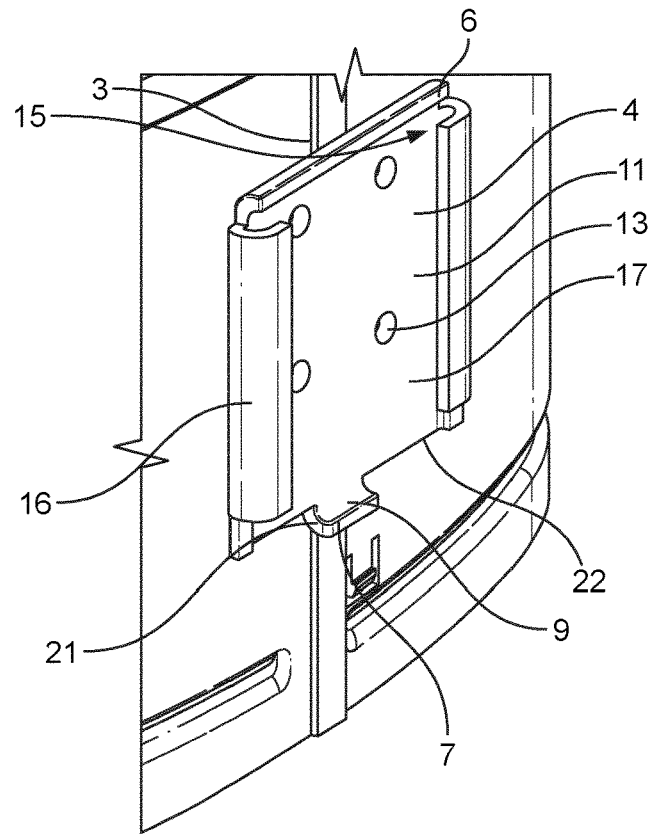
FIG. 3 shows a schematic perspective view of the female portion of the detachable coupling arrangement shown in FIG. 1 and FIG. 2 mounted on a utensil and uncoupled from the male portion.

The female portion 4 will now be described with reference to FIG. 1 to FIG. 3. FIG. 3 shows the female portion 4 mounted on the utensil 3. The utensil 3 may be, for example, but not limited to, a cooking accessory such as a pan, a cooking accessory for an air-based fryer product, a tool, or a container. It will be understood that in an alternative embodiment, the female portion 4 may be mounted on the handle 2. The female portion 4 is shown uncoupled from the male portion 5.

In the first embodiment, shown in FIG. 3, the female portion 4 comprises a base section 11. The base section 11 is configured to mount the female portion 4 on the utensil 3. The base section 11 is generally rectangular in shape. However, the base section 11 is not limited to this shape. A rear surface 12 of the base section 11 is configured to enable an improved fit of the female portion 4 on the utensil 3. As shown in FIG. 2 and FIG. 3, the base section 11 of the female portion 4 comprises a plurality of holes 13. The holes 13 are configured to receive a fastener (not shown) to secure the female portion 4 to the utensil 3. One or more such holes 13 may be provided. Alternatively, the female portion 4 may be integrally formed with the utensil 3 or handle 2.

Optionally, the female portion 4 comprises at least one slot 15. The at least one slot 15 is configured to receive the male portion 5, and is configured to restrict, if not eliminate, horizontal movement of the male portion 5 relative to the female portion 4 when the female portion 4 is coupled to the male portion 5. The embodiment shown in FIG. 1 to FIG. 3 comprises two slots 15. Referring to FIG. 3, it can be seen that the two slots 15 are configured to face each other. The two slots 15 extend parallel to each other and extend vertically along the female portion 4. The slots 15 may extend the full length of the female portion 4 or partially over the length. The slots are open ended proximate to the bottom of the female portion 4. In the first embodiment, the slots 15 are formed proximate to vertical edges of the female portion 4. The slots 15 are formed by flanges 16 which extend from a front surface 17 of the base section 11 and fold towards the centre of the female portion 4. Alternatively, the flanges 16 may extend from the side walls of the base section 11.

In alternative embodiments, the two slots 15 may extend at an angle to each other such that they converge near the top of the female portion 4. Therefore, the need for a distinct stop element 6 may be removed.

In the first embodiment, the female portion 4 comprises the stop element 6. The stop element 6 is configured to prevent unwanted uncoupling of the female portion 4 from the male portion 5. The stop element 6 prevents the utensil 3 from falling off of the handle 2 when a user is lifting the utensil 3 with the handle 2.

In the first embodiment, shown in FIG. 3, the stop element 6 extends from the front surface 17 of the female portion 14. The stop element 6 is configured to be abutted by the top of the male portion 5. The stop element 6 is preferably a horizontal wall. The stop element 6 preferably extends across the width of the base section 11 and preferably extends across the top of the female portion 4. However, in alternative embodiments the stop element 6 may be, for example, multiple short walls which extend across the female portion 4, a horizontally extending flange, or pins that protrude out of the front surface 17.

An advantage of having the stop element 6 located at the top of the female portion 4 is that the male portion 5 on the handle 2 cannot be uncoupled by moving the male portion 5 in the upwards direction A relative to the female portion 4. Instead, the stop element 6 allows the female portion 4 and male portion 5 to remain coupled and facilitates the lifting of the utensil 3 by the handle 2. Therefore, the male portion 5 can only be uncoupled from the female portion 4 by manipulation of the first and second retention elements 7, 8 and movement of the male portion 5 in a downward direction B relative to the female portion 4.

Furthermore, the ability of the stop element 6 located at the top of the female portion 4 to facilitate the lifting of the utensil 3 is not affected by the condition of the first and second retention elements 7, 8. When lifted, the weight of the utensil 3 pivots about the stop element 6 which causes the base section 11 to be pressed against the male portion 5. Therefore, the likelihood of the utensil 3 falling off of the handle 2 is reduced, even if the retention elements 7, 8 and the optional flanges 16 are broken.

However, it will be understood that in an alternative embodiment, the stop element 6 may be located in a different position on the female portion 4. In yet another alternative embodiment the stop element 6 may be located on the male portion 5. The stop element 6 may be configured to abut the bottom of the female portion 4 and may extend across the bottom of the male portion 5.

In the first embodiment, the female portion 4 comprises the first retention element 7 which preferably extends from the base section 11 of the female portion 4. The first retention element 7 preferably comprises the retention surface 9. The retention surface 9 of the first retention element 7 is preferably configured to be abutted by the second retention element 8 to prevent movement in the downwards direction B of the male portion 5 relative to the female portion 4.

As shown in FIG. 3, the first retention element 7 is located at the opposite end of the base section 11 to the stop element 6. The first retention element 7 is preferably located on the bottom of the base section 11. The retention surface 9 generally faces the stop element 6. The first retention element 7 preferably comprises a protrusion 21. The protrusion 21 preferably extends from the base section 11 and may extend from a bottom wall 22 of the base section 11. The protrusion 21 is generally hook-shaped. The retention surface 9 is the inner surface of the bend in the protrusion 21. The protrusion 21 preferably comprises a lower surface 23 (see FIG. 5) configured to guide the second retention element 8 over the protrusion 21 of the first retention element 7 when the male portion 5 is being coupled to the female portion 4.

In an alternative embodiment, the first retention element 7 may comprise a depression (not shown). The depression may be formed by a recess (not shown) in the front surface 17 of the base section 11. The depression may have a generally upward facing surface as its retention surface 9. The first retention element 7 may comprise both the protrusion 21 and the depression.

Figure 4:
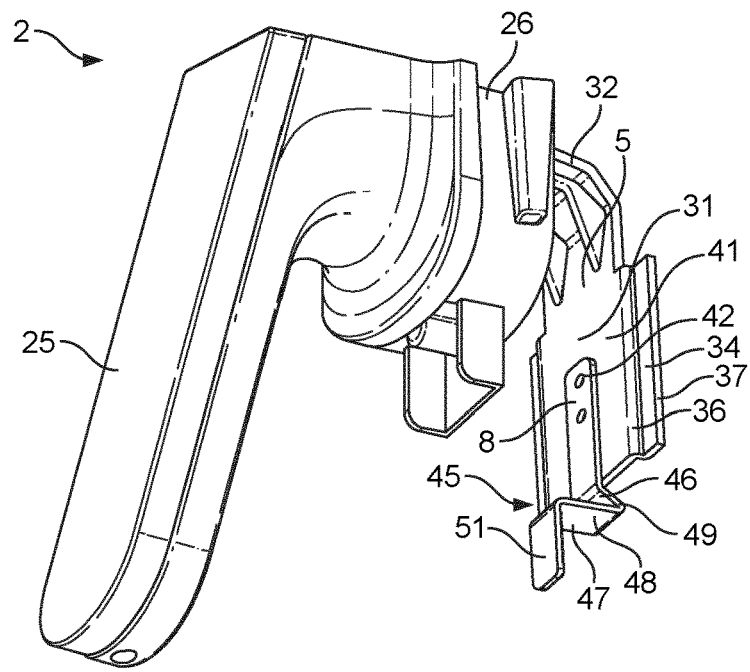
FIG. 4 shows a schematic perspective view of the male portion of the detachable coupling arrangement shown in FIG. 1 and FIG. 2 mounted on a handle, with a guard element omitted for clarity, and uncoupled from the female portion.

The male portion 5 will now be described with reference to FIG. 1, FIG. 2, and FIG. 4. FIG. 4 shows the male portion 5 mounted on the handle 2. The handle 2 may be a handle for use with a cooking accessory such as a pan, a cooking accessory for an air-based fryer product, a tool, or a container. The handle 2 comprises a gripping portion 25 and the male portion 5. Optionally, the handle 2 may further comprise a second detachable coupling arrangement 26. The second detachable coupling arrangement 26 may be included in a handle 2 for use with a cooking accessory or an air fryer product. However, it will be understood that in an alternative embodiment, handle 2 may not comprise the male portion 5. In such an embodiment, the male portion 5 may be located on the utensil 3 and the female portion 4 may be located on the handle 2.

The male portion 5 comprises a main body 31. The main body 31 of the male portion 5 is spaced from the rest of the handle 2 by a connecting portion 32. The main body 31 and connecting portion 32 may be integrally formed. The connection portion 32 may comprise a fixing arrangement (not shown) configured to fix the main body 31 to the gripping portion 25. Alternatively, the main body 31, connecting portion 32, and gripping portion 25 may all be integrally formed.

The main body 31 of the male portion 5 may extend at an angle to the gripping portion 25 of the handle 2. The angle between the main body 31 and the gripping portion 25 may be up to 90 degrees. However, preferably the angle between the main body 31 and the gripping portion 25 is less than 45 degrees. The angle between the main body 31 and the gripping portion 25 may be selected to enable a user to grip the handle 2 and urge the second retention element 8 with one hand for uncoupling the male portion 5 from the female portion 4.

In the first embodiment, as shown in FIG. 1, FIG. 2, and FIG. 4, the male portion 5 is configured to cooperate with the female portion 4 on the utensil 3. The main body 31 of the male portion 5 is generally rectangular in shape. However, the main body 31 is not limited to this shape. The shape of the main body 31 generally corresponds to the shape of the base section 11 of the female portion 4. In the first embodiment, the male portion 5 is adapted to slidably cooperate with the female portion 4. The main body 31 has a rear surface configured to be placed proximate to the front face 17 of the female portion 4 when the female portion 4 is coupled to the male portion 5.

Optionally, the male portion 5 of the detachable coupling arrangement 1 comprises a projection 34. In the first embodiment, the male portion comprises two projections 34. The projections 34 are preferably arms. Each projection 34 protrudes from a side wall 35 of the main body 31 of the male portion 5. The projections 34 are configured to be disposed in the slots 15.

The projections 34 are preferably orientated vertically such that they cooperate with the vertical slots 15. The projections 34 may extend the full length of the main body 31 of the male portion 5. Alternatively, the projections 34 may extend only partially along the length of the main body 31. The projections 34 preferably comprise a spacing portion 36 and an engaging portion 37. The spacing portion 36 and engaging portion 37 are configured to cooperate with the slots 15 on the female portion 4.

As shown in FIG. 1 and FIG. 2, the engaging portion 37 is configured to be located in the slot 15 of the female portion to prevent horizontal movement of the male portion 5 relative to the female portion 4 when the detachable coupling arrangement 1 is coupled. The spacing portions 36 preferably extend from side walls 35 of the main body 31 and extend from the side walls 35 at an angle. The spacing portions 36 preferably extend away from the main body 31 on the rear surface side of the main body 31.

The engaging portions 37 preferably extend parallel to the main body 31. The engaging portions 37 may extend from the spacing portions 36. Therefore, the rear surface of the main body 31 is configured to enable the male portion 5 to be slid into cooperation with the female portion 4. That is, the projections 34 of the main body 31 are able to slidably cooperate with the slots 15 of the female portion 4 without the main body 31 abutting the protrusion 21 of the first retention element 7.

However, it will be understood that the invention is not limited to the arrangement of this first embodiment and that in alternative embodiments the number of projections 34 and their configuration may vary.

In the first exemplary embodiment, the male portion 5 further comprises the second retention element 8. The second retention element 8 is resiliently deformable. The second retention element 8 is configured to releasably fixedly locate the male portion 5 relative to the female portion 4 when the female portion 4 and male portion 5 are coupled together. The second retention element 8 is attached to a front surface 41 of the main body 31 of the male portion 5. The second retention element 8 is attached to the front surface 41 of the main body 31 by a fastening arrangement 42. The fastening arrangement 42 may be, for example, but not limited to a plurality of screws. It will be understood that in an alternative embodiment of the invention, the second retention element may be integrally formed with the main body 31 of the male portion 5.

In the first embodiment, the second retention element 8 comprises a vertical portion 44. The vertical portion 44 is preferably attached to the front surface 41 at its top end by the fastening arrangement 42. The vertical portion 44 may extend from the centre of the front surface 41 of the main body 31 and preferably extends vertically downwards to the bottom of the main body 31 of the male portion 5. The second retention element 8 may extend beyond the bottom of the main body 31. The lower end of the second retention element 8 may have a generally zig-zag configuration.

The second retention element 8 further comprises an abutment portion 45. The abutment portion 45 may extend from the bottom end of the vertical portion 44. The abutment portion 45 is configured to abut the retention surface 9 of the female portion 4, shown in FIG. 3, when the second retention element 8 is in an engaged position, shown in FIG. 1 and FIG. 2, when the male portion 5 is coupled to the female portion 4.

In the first embodiment, the abutment portion 45 comprises a first part 46. The first part 46 may extend from the bottom of the vertical portion 44. The first part 46 extends at an angle to the vertical. The first part 46 preferably extends beyond the rear surface of the main body 31 of the male portion 5, away from the front surface 41.

The abutment portion 45 further comprises a second part 47. The second part 47 may extend from the bottom of the first part 46. The second part 47 extends at an angle to the first part 46. In the first embodiment, the second part 47 extends in the opposite direction to the first part 46. That is, the second part 47 extends beyond the front surface 41 of the main body 31 of the male portion 5, away from the rear surface. The second part 47 preferably extends generally in the horizontal direction. The second part 47 has a lower surface 48. The lower surface 48 is configured to at least partially abut the retention surface 9 of the first retention element 7 of the female portion 4, shown in FIG. 3. It will be appreciated that the second retention element 8 engages the lower surface 23 of the protrusion 21 when the male portion 5 has almost been completely received in the female portion 4, i.e. just prior to when stop element 6 is abutted by the top of the male portion 5 so that, when the male portion 5 is fully received in the female portion 4 and the top of the male portion 5 abuts the stop element 6, the lower surface 48 of the second retention element 8 abuts the retention surface 9. Coupling of the male portion 5 to the female portion 4 is therefore made easier.

The angle between the first part 46 and second part 47 is preferably less than 90 degrees. Preferably, the angle between the first part 46 and the second part 47 is less than 45 degrees. Preferably, the second part 47 extends in a slightly upwards fashion just above the horizontal. This helps to reduce the likelihood of accidental uncoupling of the second retention element 8 over the first retention element 7.

A vertex 49 may be formed at the point where the first part 46 meets the second part 47. The lower surface 48 and external part of the vertex 49 of the second part 47 are configured to locate against the retention surface 9 of the first retention element 7 on the female portion 4, shown in FIG. 3. Furthermore, the lower surface 48 of the abutment portion 45 and the vertex 49 may be configured to be located in a depression (not shown) in the base section 11 of the female portion 4.

The second retention element 8 further comprises a trigger portion 51. The trigger portion 51 may extend from the bottom end of the abutment portion 45. In the first exemplary embodiment, the abutment portion 45 and the trigger portion 51 form the zig-zag configuration of the lower end of the second retention element 8.

The trigger portion 51 preferably extends generally in a downwards vertical direction. The trigger portion 51 is configured to enable to a user to resiliently deform the second retention element 8 and urge the abutment portion 45 from its engaged position, in which it abuts the retention surface 9 of the first retention element 7, to a release position to uncouple the male portion 5 from the female portion 4. The release position is the position is which the second retention element 8 has been retracted far enough from the first retention element 7 to allow the male portion 5 to be uncoupled from the female portion 4. Preferably, the release position allows uncoupling without any contact between the first and second retention elements 7, 8.

Figure 5:
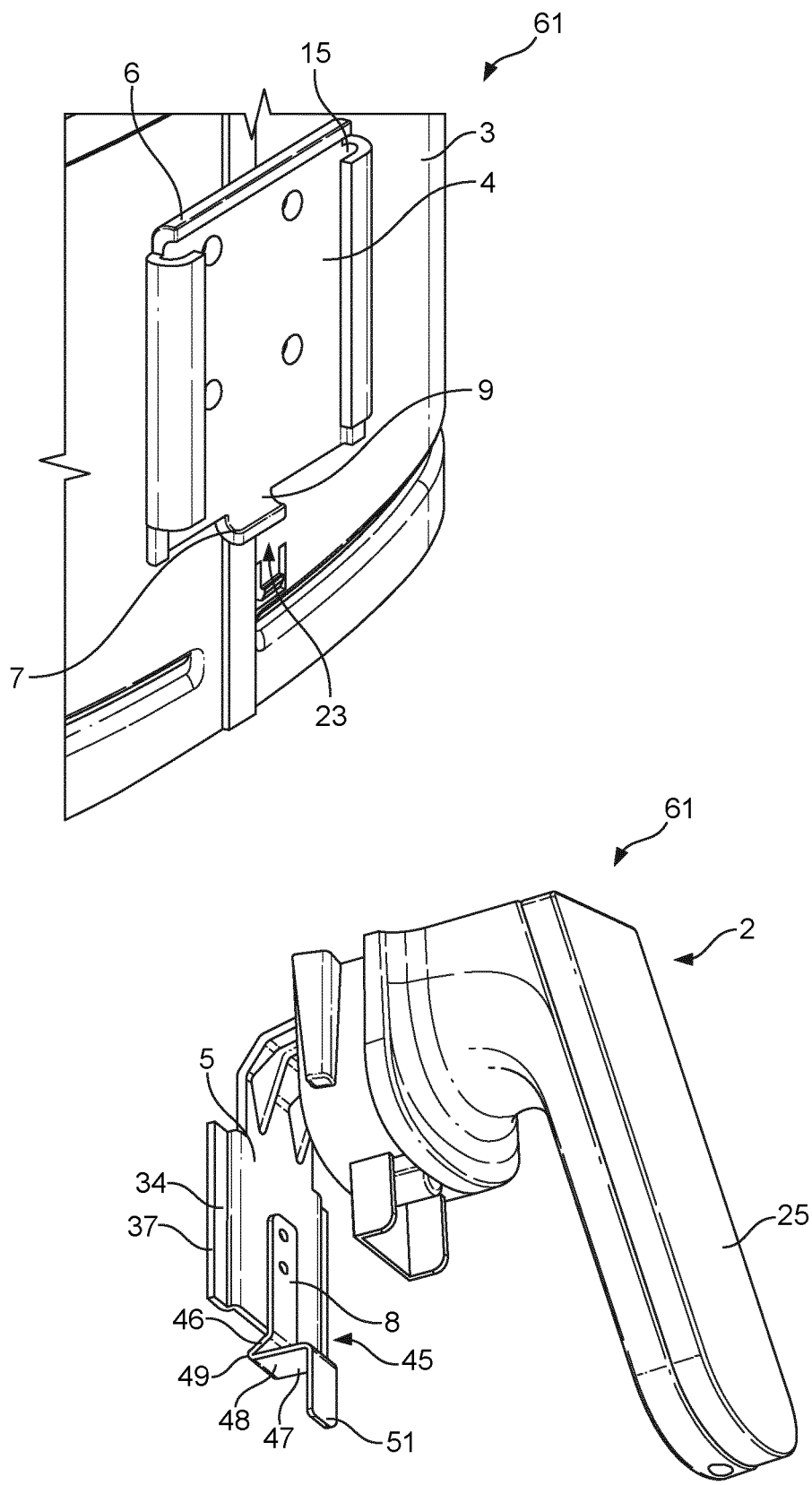
FIG. 5 shows a schematic perspective view of an uncoupled appliance comprising the utensil having the female portion shown in FIG. 3 and the handle having the male portion shown in FIG. 4.
Figure 6:
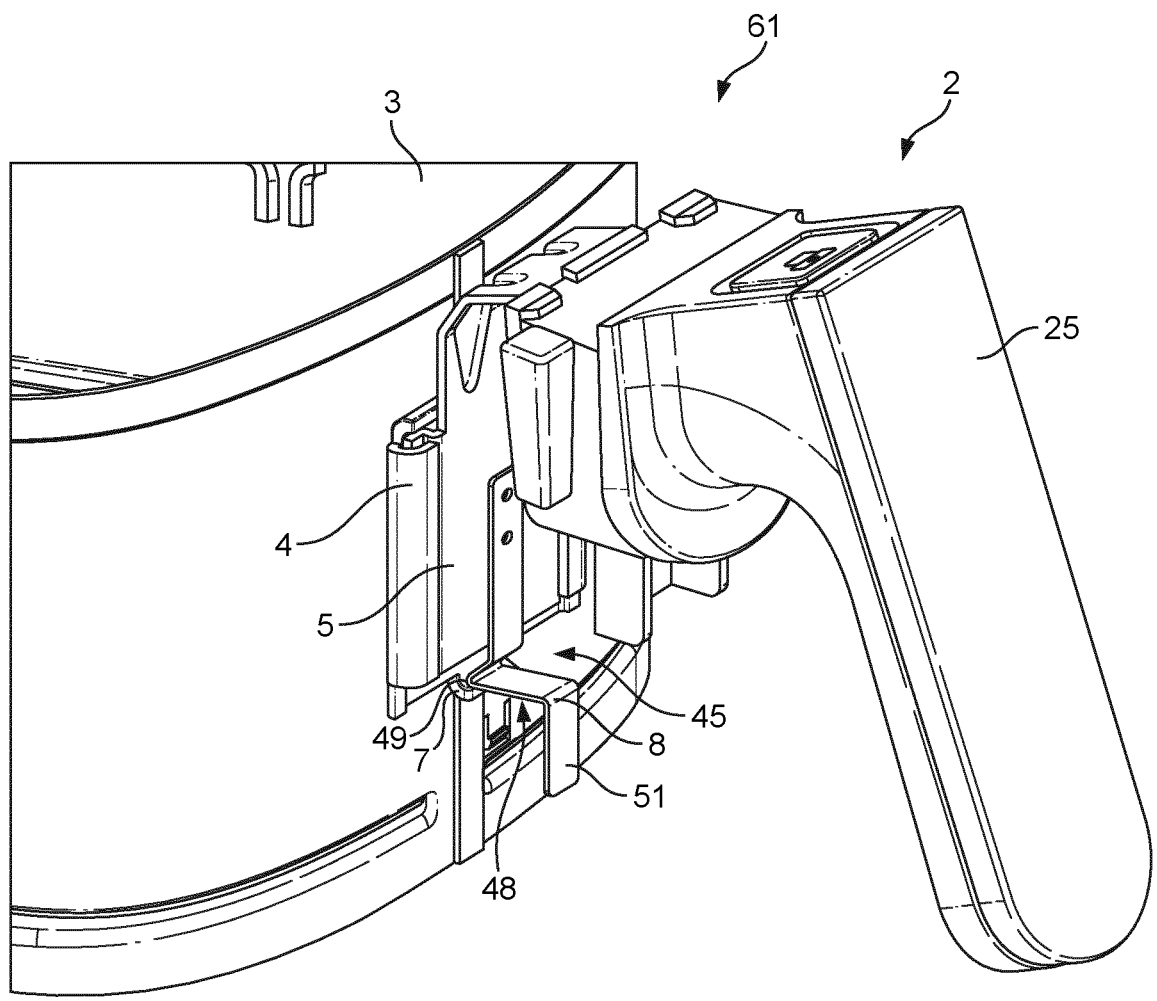
FIG. 6 shows a schematic perspective view of the appliance shown in FIG. 5 coupled together by the detachable coupling arrangement.

As shown in FIG. 1 and FIG. 2, but omitted in FIG. 4 to FIG. 6 for sake of clarity, the trigger portion 51 may comprise a tab 52. The tab 52 may be located around the trigger portion 51. The tab 52 may be configured to, for example, make it easier for the user to urge the second retention element 8 from its engaged position to its release position, reduce bending of the trigger portion 51, or reduce heat transfer to the user.

In the first embodiment, when the second retention element 8 is in the release position, the male portion 5 can be slidably uncoupled from the female portion 4 by moving the male portion 5 in a downward direction B relative to the female portion 4. However, it will be understood that in alternative embodiments the configuration of the second retention element 8 may vary to cooperate with the configuration of the first retention element 7 and the retention surface 9. For example, the position of the vertical, abutment, and trigger portions 44, 45, 51 may vary. Furthermore, the number of parts 46, 47 making up the abutment portion 45 may vary.

In the first embodiment, the male portion 5 further comprises a guard element 55 as shown in FIG. 1 and FIG. 2. The guard element has been omitted in FIG. 4 to FIG. 6 for clarity. The guard element 55 is configured to limit the range of movement of the second retention element 8 when disengaging the second retention element 8 from the first retention element 7. The guard element 55 helps to prevent the second retention element 8 from being subject to overbending. Therefore, the guard element 55 helps to prevent the second retention element 8 breaking. The guard element 55 is configured to be abutted by the second retention element 8 when a user urges the second retention element 8 into the release position.

In the first embodiment, the guard element 55 is located at the bottom of the male portion 5. The guard element 55 is preferably located at the bottom of the main body 31. The guard element 55 comprises an extension element 56. The extension element 56 effectively increases the length of the male portion 5. The extension element 56 preferably extends vertically downwards from the bottom of the main body 31 of the male portion 5. The first exemplary embodiment comprises two extension elements 56. Each extension element 56 preferably extends from an opposite side of the main body 31.

An aperture 57, shown in FIG. 1 and FIG. 2, is defined between the extension elements 56. The aperture 57 extends into the main body 31 of the male portion 5. The top edge of the aperture 57 is preferably located below the fastening arrangement 42 that fixes the second retention element 8 to the main body 31. The second retention element 8 extends through the aperture 57. The aperture 57 is generally rectangular and configured to allow the second retention element 8 to be urged through partially. However, in alternative embodiments the shape of the aperture 57 may vary.

In the first embodiment, shown in FIG. 1, the front surface 41 of the main body 31 of the male portion 5 comprises a recess 58. The recess 58 is preferably located centrally in the front surface 41 of the main body 31 and above the aperture 57. The recess 58 opens into the aperture 57 at one end. The recess 58 accommodates the top of the vertical portion 44 of the second retention element 8.

The guard element 55 further comprises an abutment element 59. The abutment element 59 preferably extends at an angle to the second retention element 8. Preferably, the abutment element 59 extends perpendicularly to the second retention element 8. That is, the abutment element 59 preferably extends horizontally. The abutment element 59 preferably extends between the two extension elements 56. The abutment element 59 defines the bottom of the aperture 57.

The abutment element 59 is configured to limit the range of movement of the second retention element 8. That is, the abutment element 59 of the guard element 55 is positioned such that when the user urges the abutment portion 45 of the second retention element 8 from the engaged position, the abutment element 59 abuts the abutment portion 45 to define the maximum release position. Therefore, the abutment portion 45 is configured to abut the guard element 55 when the second retention element 8 is in a release position to enable the male portion 5 to be uncoupled form the female portion 4. In particular, the guard element 55 may be configured such that the internal part of the vertex 49 abuts against the abutment element 59.

In the first embodiment, the second retention element 8 is configured to be biased away from the guard element 55 to releasably fixedly locate the male portion 5 relative to the female portion 4 when the female portion 4 and the male portion 5 are coupled together. More specifically, the second retention element 8 may be configured to be biased away from the abutment element 59.

The method of coupling and uncoupling the detachable coupling arrangement 1 will now be described with reference to FIG. 5 and FIG. 6. FIG. 5 shows a schematic perspective view of an uncoupled appliance 61 comprising the utensil 3 having the female portion 4 shown in FIG. 3 and the handle 2 having the male portion 5 shown in FIG. 4. The appliance 61 is partially represented for sake of clarity and may correspond to, for example, but not limited to, an air-based fryer product using circulation of hot air to cook food ingredients. The utensil 3 may be, for example, but not limited to a cooking accessory for an air-based fryer product. However, it will be understood that in an alternative embodiment of the appliance 61, the utensil 3 may have the male portion 5 and the handle 2 may have the female portion 4.

To couple the uncoupled detachable coupling arrangement 1, the user places the utensil 3 the correct way up, on its base (not shown). The user then holds the handle 2 by the gripping portion 25 and places the male portion 5 mounted on the handle 2 below the female portion 4 mounted on the utensil 3.

The user then aligns the projection 34 on the male portion 5 with the slot 15 on the female portion 4. Once the projection 34 has been aligned with the slot 15 the user slides the male portion 5 in the upwards direction A relative to the female portion 4 by raising the handle 2.

The engaging portion 37 of the projection 34 slides along the slot 15 until the second retention element 8 locates over the first retention element 7 and the projection 34 abuts the stop element 6. Both actions may take place simultaneously. In an alternative embodiment, the second retention element 8 may locate over the first retention element 7 before the projection 34 abuts the stop element 6.

As the projection 34 slides in the upwards direction A along the slot 15, the second retention element 8 is brought into contact with the first retention element 7. More specifically, the first part 46 of the abutment portion 45 of the second retention element 8 contacts the lower surface 23 of the first retention element 7. The angle at which the first part 46 of the abutment portion 45 extends to the vertical preferably urges the second retention element 8 to resiliently deform away from the first retention element 7 as the male portion 5 is raised in the upward direction A.

Once the external part of the vertex 49 passes the edge of the first retention element 7, the lower surface 48 of the second part 47 and the external part of the vertex 49 of the abutment portion 45 resiliently deform back into the engaged position in abutment with the retention surface 9 of the first retention element 7. Preferably, the second retention element 8 resiliently deforming back into its original shape, over the first retention element 7, and into abutment with the retention surface 9 coincides with the top of the main body 31 of the male portion 5 abutting the stop element 6. This helps to prevent any vertical movement between the female portion 4 and the male portion 5. Therefore, the second retention element 8 locates over the first retention element 7.

FIG. 6 shows a schematic perspective view of the appliance 61 shown in FIG. 5 coupled together by the detachable coupling arrangement 1 after the above method has been performed by a user. To uncouple the coupled detachable coupling arrangement 1, the user holds the handle 2 by the gripping portion 25 and places the base (not shown) of the utensil on a surface (not shown). Preferably, the utensil is placed next to the edge of a work surface to provide space to remove the handle 2. The user then extends one of his fingers from the hand holding the handle 2, usually the index finger, and places it around the trigger portion 51 of the second retention element 8. In some embodiments, the user may also place his finger around the tab (not shown). The trigger portion 51 may be clearly biased away from the gripping portion 25 of the handle 2 and located proximate to the utensil 3. The trigger portion 51 is located at a distance from the gripping portion 25 to help prevent unintended operation of the trigger portion 51 by the user.

The user then urges the second retention element 8 from its engaged position into the release position. The user urges the second retention element 8 away from the first retention element 7 until the lower surface 48 of the second part 47 and the external part of the vertex 49 of the abutment portion 45 of the second retention element 8 are no longer in contact with the retention surface 9 of the first retention element 7. The user may further deform the second retention element 8 until the internal part of the vertex 49 abuts the horizontal abutment element 59 of the guard element 55, which have been omitted in FIG. 6 to clearly show the second retention element 8 but can be viewed in FIG. 1 and FIG. 2.

Once the second retention element 8 is in the release position, the user, whilst preferably keeping the second retention element 8 in the release position, lowers the handle 2 to slide the male portion 5 in a downward direction B relative to the female portion 4 on the utensil 3. Once the vertex 49 has passed the first retention element 7 the user may release the trigger portion 51 of the second retention element 8 and allow it to be biased away from the guard element 55 again. The user then lowers the handle 2 until the protrusion 34 of the male portion 5 is no longer in the slot 15 of the female portion.

Figure 7:
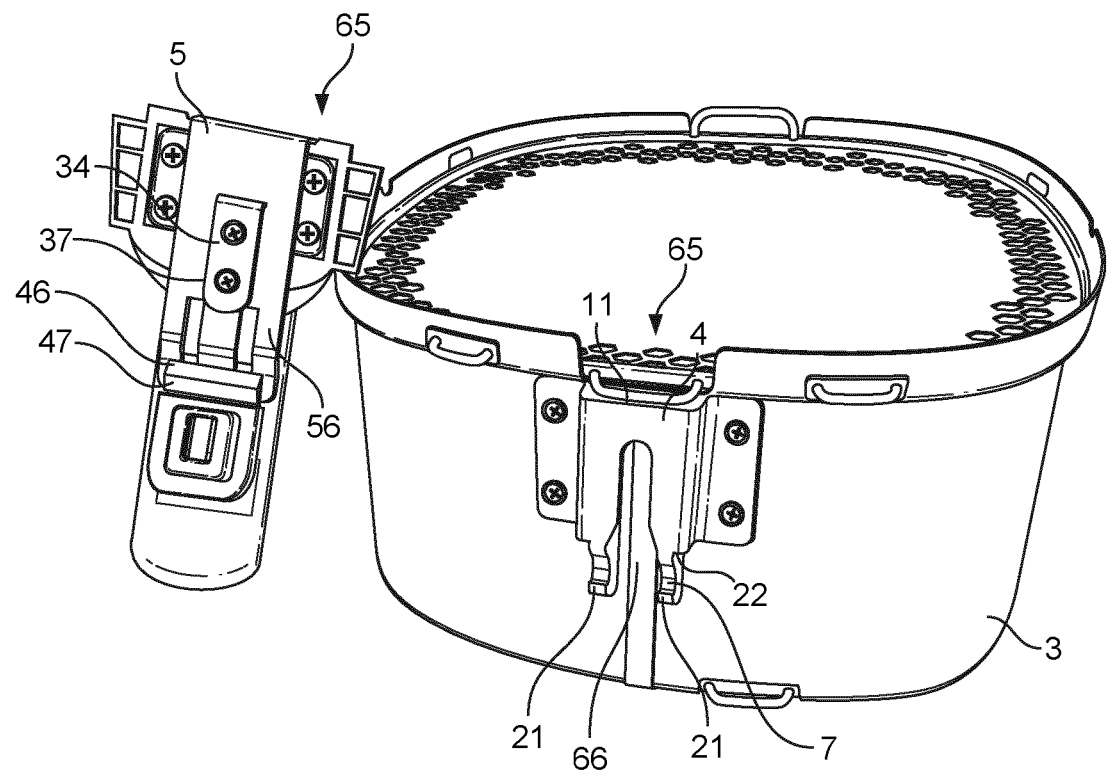
FIG. 7 shows a schematic view of a second embodiment of the detachable coupling arrangement of the present invention, in which a male portion is mounted on a handle and a female portion is mounted on a utensil.
Figure 8:
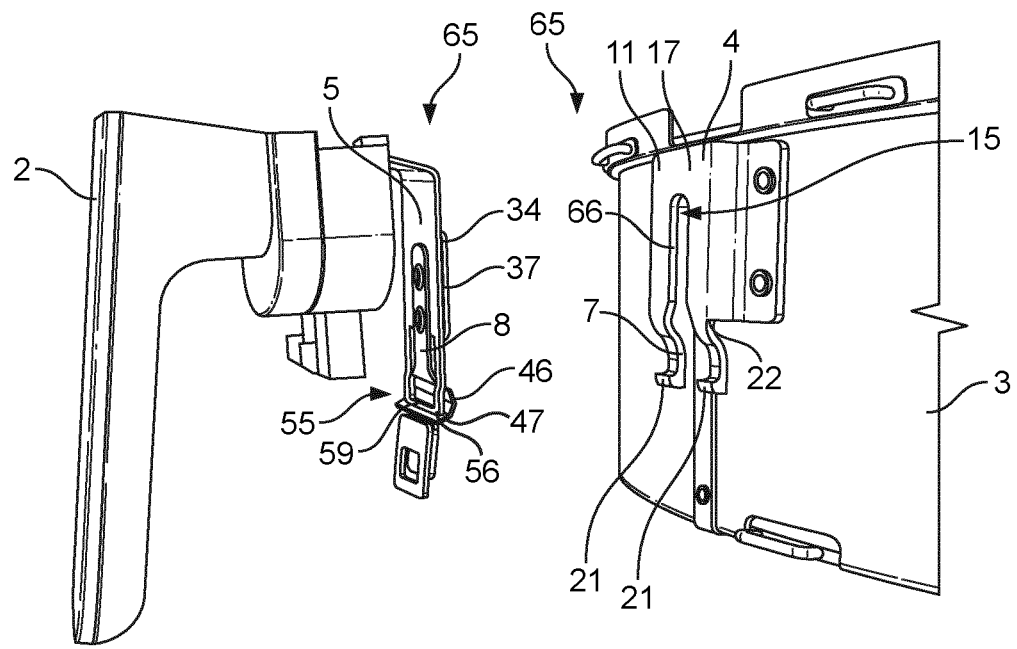
FIG. 8 shows a schematic side view of the detachable coupling arrangement shown in FIG. 7.

Referring now to FIG. 7 and FIG. 8, a second embodiment of a detachable coupling arrangement 65 of the present invention is shown. The detachable coupling arrangement 65 is generally the same as the first embodiment of the detachable coupling arrangement 1 described above and so a detailed description will be omitted herein. Furthermore, features and components of the detachable coupling arrangement 65 will retain the same terminology and reference numerals.

FIG. 7 shows the second embodiment of the detachable coupling arrangement 65 comprising a rear view of a male portion 5 attached to the handle 2 and a front view of a female portion 4 attached to the utensil 3. FIG. 8 shows a side view of the handle 2 and utensil 3 uncoupled. In the second and subsequent embodiment of the invention, like features in common with the detachable coupling of the first embodiment retain the same reference numeral and a detailed description thereof will not be repeated.

In the second embodiment, the female portion 4 comprises an aperture 66. The aperture 66 is preferably located centrally in a base section 11 of the female portion 4. The base section 11 of the female portion 4 is preferably raised and configured to cooperate with the male portion 5. The base section 11 is raised to receive a projection 34 of the male portion 5 behind a front surface 17 of the female portion 4.

Due to the central aperture 66 for receiving the male portion 5, the second exemplary embodiment comprises two protrusions 21 of a first retention element 7. One protrusion 21 extends from a bottom wall 22 of the base section 11 on either side of the aperture 66. The protrusions 21 are preferably identical to one another and configured to cooperate with a second retention element 8.

In the second embodiment, the male portion 5 comprises a single projection 34. The projection 34 is, preferably, also located centrally and is configured to cooperate with slots 15 in the aperture 66 of the female portion 4. The projection 34 has a T-shaped cross-section extending in the vertical direction. Engaging portions 37 of the projection 34 are configured to be received in the slots 15 in the base section 11. Therefore, the engaging portions 37 extend further in the horizontal direction than the width of the aperture 66.

Furthermore, in order to abut against both the protrusions 21 of the first retention element 7 the width of an abutment portion 45 of the second retention element 8 is greater than that of the first embodiment. In addition, a first part 46 of the abutment portion 45 is formed from multiple sections configured to cooperate with the shape of the protrusions 34.

However, the abutment portion 45 of the second retention element 8 is still narrow enough to be able to pass partially through an aperture 57 in a main body 31 of the male portion 5. The abutment portion 45 of the second retention element 8 is prevented from completely passing through the aperture 57 by a guard element 55. The guard element 55 comprises extension elements 56 which are connected by a horizontal abutment element 59. The extension elements 56 are curved to allow for greater movement of the second retention element 8 between the maximum release position against the abutment element 59 and the engaged position, than the vertical extension elements 56 described in the first embodiment.

Figure 9:
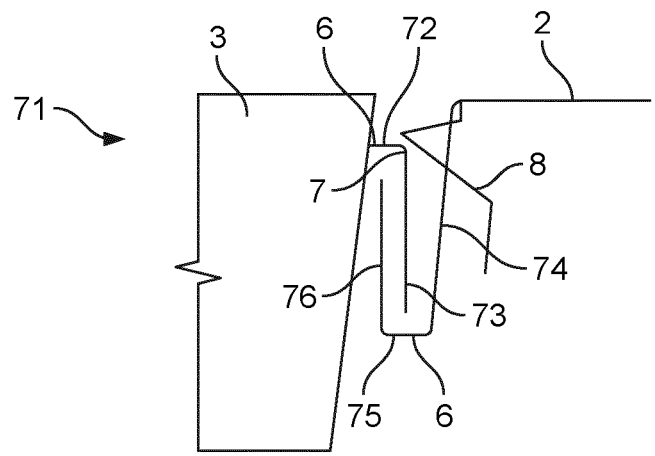
FIG. 9 shows a schematic cross-sectional view of a third embodiment of the detachable coupling arrangement of the present invention.

FIG. 9 shows a cross-sectional view of a third embodiment of a detachable coupling arrangement 71 of the present invention. The detachable coupling arrangement 71 is an interlocking handle embodiment. In such an embodiment, the female or male portions 4, 5 may have a stop element 6. Furthermore, the detachable coupling arrangement 71 can be arranged so that the portion attached to a handle 2 can be female or male.

In the third embodiment, the female portion 4 may be mounted on the utensil 3 and the male portion 5 may be mounted on the handle 2. The female portion 4 preferably comprises a horizontal flange 72 extending from the utensil 3 and a vertical plate 73. The horizontal flange 72 may act as a stop element 6 to stop upwards movement of the male portion 5. The vertical plate 73 may comprise one or more slots (not shown), as described in previous embodiments, on the side of the vertical plate 73 facing the utensil 3. The side of the vertical plate 73 facing away from the utensil 3 preferably comprises a first retention element 7.

The male portion 5 preferably comprises a downwardly extending vertical plate 74. The downwardly extending vertical plate 74 preferably comprises a second retention element 8 configured to locate over the first retention element 7 when the male portion 5 is coupled to the female portion 4. In the third embodiment, the male portion 5 further comprises a horizontal flange 75 extending away from the handle 2 and an upwardly extending vertical plate 76 extending from the end of the horizontal flange 75. The horizontal flange 75 may act as a stop element 6. The upwardly extending vertical plate 76 preferably comprises at least one protrusion (not shown), as described in previous embodiments, configured to locate in the at least one slot (not shown).

However, in an alternative embodiment, it will be understood that the female portion 4 may be mounted on the handle 2 and comprise the downwardly extending vertical plate 74, horizontal flange 75, and upwardly extending vertical plate 76. However, the upwardly extending vertical plate 76 may comprise one or more slots (not shown), as described in previous embodiments, on the side of the vertical plate 73 facing the handle 2. The male portion 5 may be mounted on the utensil 3 and comprise the horizontal flange 72 and vertical plate 73. The vertical plate 73 may comprise at least one protrusion (not shown), as described in previous embodiments, configured to locate in the at least one slot (not shown).

It will be understood that the third embodiment of the detachable coupling arrangement 71 of the present invention may comprises a guard element (not shown in FIG. 9) as previously described.

Figure 10:
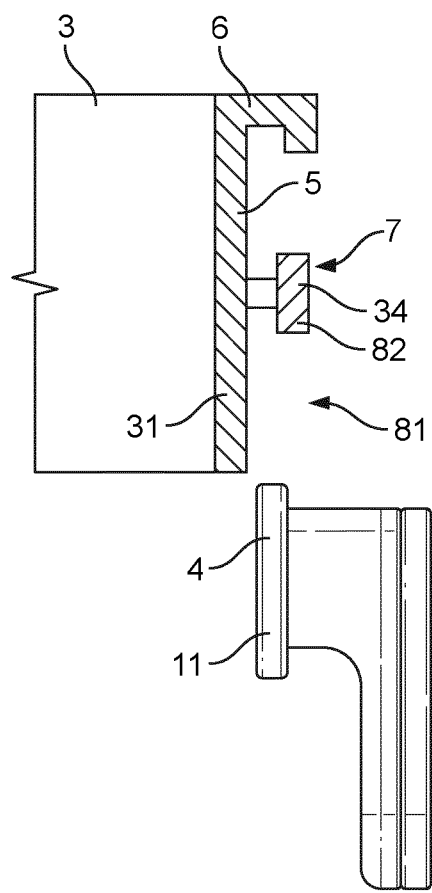
FIG. 10 shows a schematic cross-sectional view of a fourth embodiment of the detachable coupling arrangement of the present invention.

FIG. 10 shows a cross-sectional view of a fourth embodiment of a detachable coupling arrangement 81 of the present invention. In the fourth embodiment, a male portion 5 is mounted on the utensil 3. The male portion 5 preferably comprises a stop element 6 at the top of a main body 31 and a pin 82. The pin 82 preferably acts as a first retention element 7 and as a protrusion 34 to prevent relative movement between the male portion 5 and a female portion 4.

The female portion 4 is preferably mounted on the handle 2. The female portion 4 preferably comprises an aperture (not shown), as previously described, which extends from the top of the base section 11 towards its centre. The aperture preferable comprises slots (not shown), as previously described, to cooperate with the pin 82. Optionally, the bottom end of the aperture may act as a stop element 6. The female portion 4 preferably comprises the second retention element (not shown) as previously described, configured to cooperate with the first retention element 7.

It will be understood that the fourth embodiment of the detachable coupling arrangement 81 of the present invention may comprises a guard element (not shown in FIG. 10) as previously described.

Figure 11:
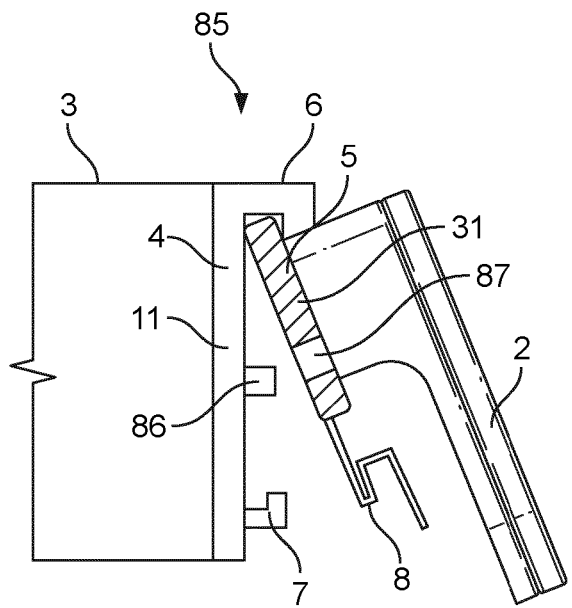
FIG. 11 shows a schematic cross-sectional view of a fifth embodiment of the detachable coupling arrangement of the present invention.

FIG. 11 shows a cross-sectional view of a fifth embodiment of a detachable coupling arrangement 85 of the present invention. In the fifth embodiment, a male portion 5 is configured to pivotably cooperate with a female portion 4, instead of slidably cooperate. The female portion 4 is preferably mounted on the utensil 3. The female portion 4 preferably comprises a stop element 6 at the top of a base section 11 and a first retention element 7 towards the bottom end. The female portion 4 may further comprise a projection 86 extending from the base section 11 configured to cooperate with a recess 87 in the male portion 5 to prevent relative horizontal movement between the female portion 4 and male portion 5 when coupled.

The male portion 5 preferably comprises a second retention element 8 located at the bottom of a main body 31 configured to locate over the first retention element 7. The top of the male portion 5 mounted on the handle 2 is inserted into the female portion 4 on the utensil 3 against the stop element 6 and pivoted downwards until the second retention element 8 on the male portion 5 locates over the first retention element 7 on the bottom of the female portion 4. The projection 86 engages the recess 87.

It will be understood that the fifth embodiment of the detachable coupling arrangement 85 of the present invention may comprises a guard element (not shown in FIG. 11) as previously described.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A detachable coupling arrangement for connecting a handle to a utensil, the detachable coupling arrangement comprising:
    a male portion;
    a female portion adapted to receive the male portion;
    a stop element for preventing movement of the male portion relative to the female portion in an upward direction (A) above the stop element when the female portion is coupled to the male portion; and
    a first retention element and a resiliently deformable second retention element configured to cooperate with one another to prevent movement of the male portion relative to the female portion in a downward direction (B), opposite the upward direction (A), when the female portion is coupled to the male portion,
    wherein the first retention element includes a retention surface facing in the upward direction (A) and a lower surface facing in the downward direction (B), and
    wherein the second retention element is configured so that it engages the lower surface, as the male portion is received in the female portion in the upward direction (A) below the stop element, to resiliently deform the second retention element so that it locates up and over the lower surface of the first retention element and abuts against the retention surface for preventing movement of the male portion relative to the female portion in the downward direction (B) below the retention surface when the female portion is coupled to the male portion.

2. The detachable coupling arrangement according to claim 1, further comprising a guard element configured to limit the range of movement of the second retention element when disengaging the second retention element from the first retention element.

3. The detachable coupling arrangement according to claim 2, wherein the second retention element is configured to be biased away from the guard element to releasably fixedly locate the male portion relative to the female portion when the female portion and the male portion are coupled together.

4. The detachable coupling arrangement according to claim 2, wherein the guard element comprises an element that extends at an angle to the second retention element and is configured to limit the range of movement of the second retention element.

5. The detachable coupling arrangement according to claim 2, wherein the second retention element comprises an abutment portion configured to abut said retention surface when the second retention element is in an engaged position and the male portion is coupled to the female portion.

6. The detachable coupling arrangement according to claim 5, wherein the abutment portion is configured to abut the guard element when the second retention element is in a release position to enable the male portion to be uncoupled from the female portion.

7. The detachable coupling arrangement according to claim 5, wherein the second retention element further comprises a trigger portion configured to enable a user to resiliently deform the second retention element and urge the abutment portion from the engaged position to a release position to uncouple the male portion from the female portion.

8. The detachable coupling arrangement according to claim 1, wherein the female portion comprises at least one slot extending vertically along the length of the female portion.

9. The detachable coupling arrangement according to claim 8, wherein the male portion is adapted to be slidably receivable in the female portion, the male portion comprising a projection being configured to be disposed in said at least one slot.

10. The detachable coupling arrangement according to claim 1, wherein the first retention element comprises a protrusion extending from a bottom part of one of the female portion and the male portion.

11. The detachable coupling arrangement according to claim 1, wherein the first retention element comprises a depression extending into a bottom part of one of the female portion and the male portion.

12. The detachable coupling arrangement according to claim 1, wherein the stop element extends across the top of the female portion.

13. A handle comprising either one of the female portion and the male portion of the detachable coupling arrangement according to claim 1 for attaching the handle to a utensil having the other one of the male portion and the female portion of the detachable coupling arrangement, respectively,
    wherein the female portion and/or the male portion comprise a stop element for preventing movement of the male portion relative to the female portion in an upward direction (A) above the stop element when the female portion is coupled to the male portion; and
    wherein either the female portion or the male portion comprises a first retention element and the other one of the female portion and the male portion comprises a resiliently deformable second retention element, configured to cooperate with one another to prevent movement of the male portion relative to the female portion in a downward direction (B) when the female portion is coupled to the male portion, wherein the first retention element includes a retention surface facing the upward direction (A) and a lower surface facing the downward direction (B), and wherein the second retention element is configured so that it engages the lower surface, as the male portion is received in the female portion in the upward direction (A) below the stop element, to resiliently deform the second retention element so that it locates up and over the lower surface of the first retention element and abuts against the retention surface for preventing movement of the male portion relative to the female portion in the downward direction (B) below the retention surface when the female portion is coupled to the male portion.

14. A utensil comprising either one of the male portion and the female portion of the detachable coupling arrangement according to claim 1 for attaching the utensil to a handle having the other one of the female portion and the male portion of the detachable coupling arrangement, respectively, wherein the female portion and/or the male portion comprise a stop element for preventing movement of the male portion relative to the female portion in an upward direction (A) above the stop element when the female portion is coupled to the male portion; and wherein either the female portion or the male portion comprises a first retention element and the other one of the female portion and the male portion comprises a resiliently deformable second retention element, configured to cooperate with one another to prevent movement of the male portion relative to the female portion in a downward direction (B) when the female portion is coupled to the male portion, wherein the first retention element includes a retention surface facing in the upward direction (A) and a lower surface facing in the downward direction (B), and wherein the second retention element is configured so that it engages the lower surface, as the male portion is received in the female portion in the upward direction (A) below the stop element, to resiliently deform the second retention element so that it locates up and over the lower surface of the first retention element and abuts against the retention surface for preventing movement of the male portion relative to the female portion in the downward direction (B) below the retention surface when the female portion is coupled to the male portion.

15. An appliance comprising a handle, a utensil and the detachable coupling arrangement according to claim 1 for connecting the handle to the utensil, wherein:

the handle has either one of the female portion and the male portion of the detachable coupling arrangement; and the utensil has the other one of the male portion and the female portion of the detachable coupling arrangement.

* * * * *